US011900817B2

(12) United States Patent
Saptharishi et al.

(10) Patent No.: US 11,900,817 B2
(45) Date of Patent: Feb. 13, 2024

(54) AIRCRAFT SPEECH RECOGNITION SYSTEMS AND METHODS

(71) Applicant: HONEYWELL INTERNATIONAL INC., Charlotte, NC (US)

(72) Inventors: Hariharan Saptharishi, Madurai (IN); Kiran Krishna, Bangalore (IN); Vasantha Paulraj, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 248 days.

(21) Appl. No.: 16/950,462

(22) Filed: Nov. 17, 2020

(65) Prior Publication Data

US 2021/0233411 A1  Jul. 29, 2021

(30) Foreign Application Priority Data

Jan. 27, 2020  (IN) .............................. 202011003533

(51) Int. Cl.
*G08G 5/00* (2006.01)
*G10L 15/26* (2006.01)
*G10L 15/08* (2006.01)

(52) U.S. Cl.
CPC .......... *G08G 5/0021* (2013.01); *G08G 5/0004* (2013.01); *G10L 15/26* (2013.01); *G10L 2015/088* (2013.01)

(58) Field of Classification Search
CPC ....... G10L 15/26; G10L 15/22; G10L 15/183; G10L 2015/088; G08G 5/0021; G08G 5/0004; G08G 5/0013; G08G 5/0052
See application file for complete search history.

(56) References Cited

U.S. PATENT DOCUMENTS

| 5,774,841 | A  | 6/1998  | Salazar et al. |
| 6,789,061 | B1 | 9/2004  | Fischer et al. |
| 7,606,715 | B1 | 10/2009 | Krenz |

(Continued)

FOREIGN PATENT DOCUMENTS

WO  2014093384 A1  6/2014

OTHER PUBLICATIONS

Qualil, Youssef, et al., "A Context-Aware Speech Recognition and Understanding System for Air Traffic Control Domain,".

*Primary Examiner* — Daniel C Washburn
*Assistant Examiner* — Paul J. Mueller
(74) *Attorney, Agent, or Firm* — Lorenz & Kopf, LLP

(57) ABSTRACT

Methods and systems for speech recognition in an aircraft are disclosed. Methods and systems include executing an air traffic control transcription application using first acoustic and language models and executing a command and control speech recognition application using second acoustic and language models. Flight context data is processed to identify additional words not included in training of the second acoustic and language model but included in training of the first acoustic and language models. Acoustic and language model parameters are extracted corresponding to the additional words from the first acoustic and language models. The extracted acoustic and language model parameters are added to the second acoustic and language models. An aircraft control command is generated that encapsulates at least one of the additional words using the command and control speech recognition application.

10 Claims, 6 Drawing Sheets

(56) References Cited

U.S. PATENT DOCUMENTS

| | | |
|---|---|---|
| 9,715,660 B2 | 7/2017 | Parada San Martin et al. |
| 9,786,270 B2 | 10/2017 | Senior et al. |
| 2005/0055210 A1 | 3/2005 | Venkataraman et al. |
| 2007/0276651 A1* | 11/2007 | Bliss .................. G10L 15/30 704/9 |
| 2008/0065275 A1* | 3/2008 | Vizzini ............... G05D 1/0016 704/E15.045 |
| 2009/0018842 A1 | 1/2009 | Caire et al. |
| 2011/0320387 A1 | 12/2011 | He et al. |
| 2012/0239399 A1 | 9/2012 | Yamazaki et al. |
| 2013/0254153 A1 | 9/2013 | Marcheret |
| 2016/0247501 A1 | 8/2016 | Kim et al. |
| 2016/0379626 A1* | 12/2016 | Deisher ................ G10L 15/197 704/235 |
| 2018/0277116 A1* | 9/2018 | Shamasundar ...... G08G 5/0021 |
| 2020/0027449 A1* | 1/2020 | Lafon .................. G08G 5/0013 |
| 2021/0050018 A1* | 2/2021 | Kim .................... G10L 15/183 |

* cited by examiner

AIRCRAFT SPEECH RECOGNITION SYSTEMS AND METHODS

CROSS REFERENCE TO RELATED APPLICATION

The present application claims benefit of prior filed Indian Provisional Patent Application No. 202011003533, filed Jan. 27, 2020, which is hereby incorporated by reference herein in its entirety.

TECHNICAL FIELD

The present invention generally relates to speech recognition systems and methods in an aircraft system, and more particularly relates to dynamic updating of a command and control speech recognition application in an aircraft system.

BACKGROUND

Speech recognition applications are used in aircraft systems for purposes such as air traffic control (ATC) transcription, command and control, ATIS decoding. Pilots can use voice to command navigation displays, charts and radios using voice commands.

Command and control-based speech recognition should be accurate and have a fast response time. In order to keep the response time low, current command and control speech recognition systems have a relatively restricted model (e.g. supporting nearly 100 commands). Response time depends largely on the size of the acoustic and language models used by a speech recognition application. The relatively limited trained vocabulary of command and control speech recognition systems allows a fast processing time, but restricts a pilot either to using a limited number of International Civil Aviation Organization (ICAO) codes for airports/waypoints, Approach procedures, Call-Signs of other aircraft, etc, or to commands that do not include named entities.

Accordingly, it is desirable to extend use cases of command and control speech recognition without overly impacting on accuracy and response time. It is also desirable to provide methods, systems, and aircraft systems utilizing such techniques. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In accordance with exemplary embodiments, methods and systems for speech recognition in an aircraft are provided. These methods and systems include executing an air traffic control transcription application using first acoustic and language models and executing a command and control speech recognition application using second acoustic and language models. The second acoustic and language models are trained to recognize a more limited number of words than a number of words that the first acoustic and language models are trained to recognize. Flight context data is processed to identify additional words not included in training of the second acoustic and language model but included in training of the first acoustic and language models and that are useful based on the flight context data. Acoustic and language model parameters are extracted corresponding to the additional words from the first acoustic and language models. The extracted acoustic and language model parameters are added to the second acoustic and language models. An aircraft control command is generated that encapsulates at least one of the additional words using the command and control speech recognition application. The at least one of the additional words has been recognized by the second acoustic and language models.

The methods and systems allow the command and control speech recognition application to maintain relatively fast response times, whilst extending use cases, as the models are only expanded based on model parameters from the ATC transcription (ATCT) speech recognition application to the extent required by current flight context data.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
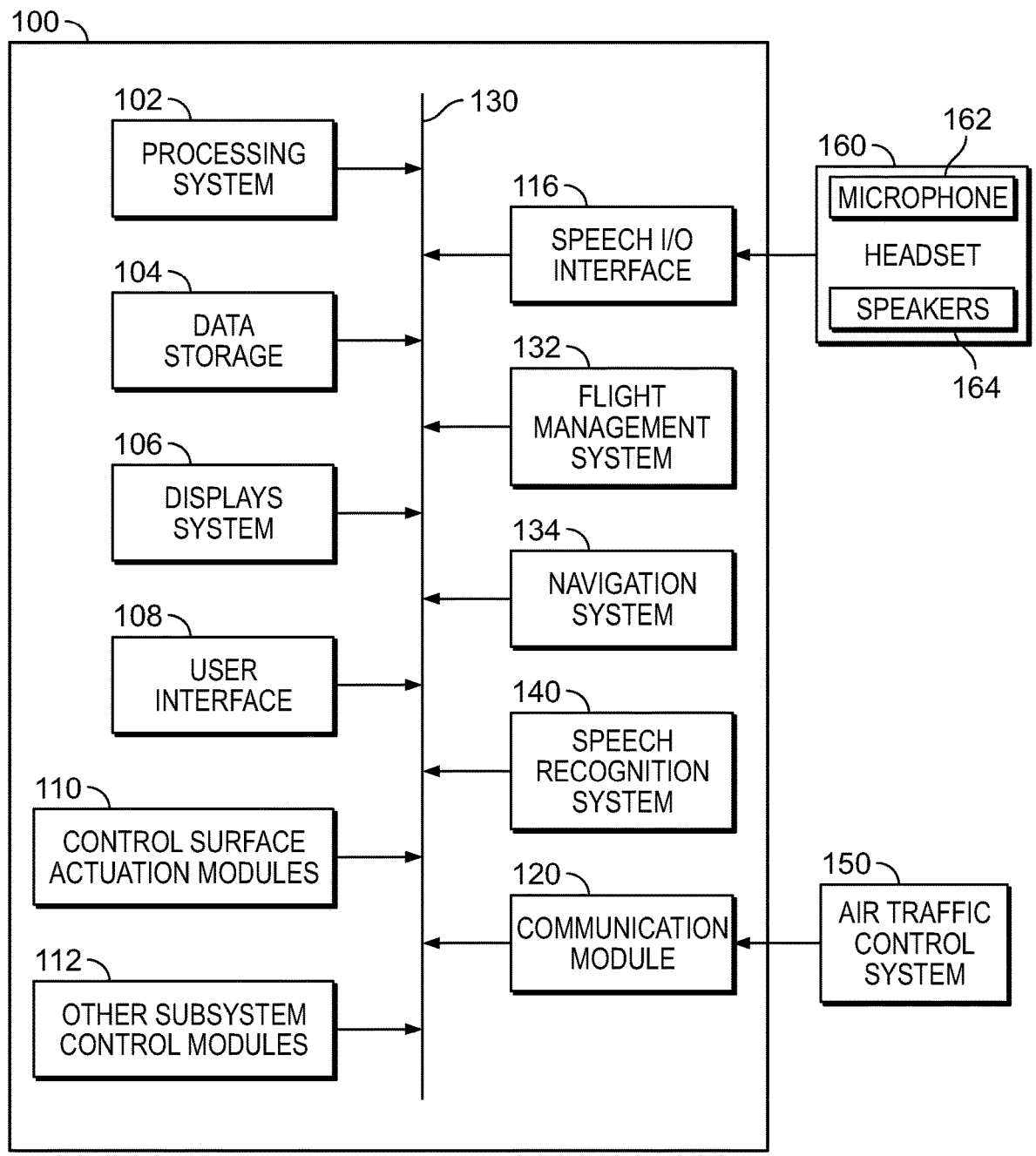
FIG. 1 is a schematic block diagram of an aircraft system, in accordance with various embodiments.

FIG. 1 is a schematic block diagram of an aircraft system 100 with a speech recognition system 140, in accordance with an exemplary embodiment. The illustrated embodiment of the aircraft system 100 includes, without limitation: at least one processing system 102; an appropriate amount of data storage 104; a displays system 106; a user interface 108; control surface actuation modules 110; other subsystem control modules 112; a speech input/output (I/O) interface 116; a flight management system (FMS) 132, a navigation system 134, a speech recognition system 140 and a communication module 120. These elements of the aircraft system 100 may be coupled together by a suitable interconnection architecture 130 that accommodates data communication, the transmission of control or command signals, and/or the delivery of operating power within the aircraft system 100. It should be understood that FIG. 1 is a simplified representation of the aircraft system 100 that will be used for purposes of explanation and ease of description, and that FIG. 1 is not intended to limit the application or scope of the subject matter in any way. In practice, the aircraft system 100 and the host aircraft will include other devices and components for providing additional functions and features, as will be appreciated in the art. Furthermore, although FIG. 1 depicts the aircraft system 100 as a single unit, the individual elements and components of the aircraft system 100 could be implemented in a distributed manner using any number of physically distinct pieces of hardware or equipment.

The processing system 102 may be implemented or realized with one or more general purpose processors, content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration). As described in more detail below, the processing system 102 may implement a speech recognition algorithm and, when operating in that context, may be considered a speech recognition system 140. In accordance with various embodiments, processing system 102 is configured to execute speech recognition system 140 so as to identify additional words that should be added or removed from command and control speech engine based on flight context data, to copy model parameters corresponding to those additional words from an air traffic control transcription (ATCT) speech engine, and to dynamically update model parameters of a command and control speech engine based on the copied model parameters. In addition, the processing system 102 may generate commands, which may be communicated through interconnection architecture 130 to various other system components. Such commands may cause the various system components to alter their operations, provide information to the processing system 102, or perform other actions, non-limiting examples of which will be provided below.

The data storage 104 may be realized as RAM memory, flash memory, EPROM memory, EEPROM memory, registers, a hard disk, a removable disk, a CD-ROM, or any other form of storage medium known in the art. In this regard, the data storage 104 can be coupled to the processing system 102 such that the processing system 102 can read information from, and write information to, the data storage 104. In the alternative, the data storage 104 may be integral to the processing system 102. As an example, the processing system 102 and the data storage 104 may reside in an ASIC. In practice, a functional or logical module/component of the aircraft system 100 might be realized using program code that is maintained in the data storage 104. For example, the processing system 102, the displays system 106, the control modules 110, 112, the speech I/O interface 116, and/or the communication module 120 may have associated software program components that are stored in the data storage 104. Moreover, the data storage 104 can be used to store data (e.g., voice training data) utilized to support the implementation of speech recognition and the operation of the aircraft system 100, as will become apparent from the following description.

The displays system 106 includes one or more displays and associated graphics processors. Processing system 102 and displays system 106 cooperate to display, render, or otherwise convey one or more graphical representations, synthetic displays, graphical icons, visual symbology, or images associated with operation of the host aircraft. An embodiment of the aircraft system 100 may utilize existing graphics processing techniques and technologies in conjunction with the displays system 106. For example, displays system 106 may be suitably configured to support well known graphics technologies such as, without limitation, VGA, SVGA, UVGA, or the like.

User interface 108 is suitably configured to receive input from a user (e.g., a pilot) and, in response to the user input, to supply appropriate command signals to the processing system 102. The user interface 108 may include any one, or any combination, of various known user interface devices or technologies, including, but not limited to: a cursor control device such as a mouse, a trackball, or joystick; a keyboard; buttons; switches; knobs; levers; or dials. Moreover, the user interface 108 may cooperate with the displays system 106 to provide a graphical user interface. Thus, a user can manipulate the user interface 108 by moving a cursor symbol rendered on a display, and the user may use a keyboard to, among other things, input textual data. For example, the user could manipulate the user interface 108 to initiate or influence execution of the speech recognition application by the processing system 102, and the like.

In an exemplary embodiment, the communication module 120 is suitably configured to support data communication between the host aircraft and one or more remote systems. For example, the communication module 120 may be designed and configured to enable the host aircraft to communicate with an air traffic control (ATC) system 150, automatic terminal information service (ATIS), other ground and air communications, etc. In this regard, the communication module 120 may include or support a datalink subsystem that can be used to provide ATC data to the host aircraft and/or to send information from the host aircraft to the ATC system 150, preferably in compliance with known standards and specifications. In certain implementations, the communication module 120 is also used to communicate with other aircraft that are near the host aircraft and optionally also with ground vehicles. For example, the communication module 120 may be configured for compatibility with Automatic Dependent Surveillance-Broadcast (ADS-B) technology, with Traffic and Collision Avoidance System (TCAS) technology, and/or with similar technologies. Communication module 120 is configured to receive voice data from various external systems and to provide transcription audio data 222 (see FIG. 2) and other audio data to speech recognition system 140.

Control surface actuation modules 110 include electrical and mechanical systems configured to control the orientation of various flight control surfaces (e.g., ailerons, wing flaps, rudder, and so on). Processing system 102 and control surface actuation modules 110 cooperate to adjust the orientation of the flight control surfaces in order to affect the attitude and flight characteristics of the host aircraft. Processing system 102 also may cooperate with other subsystem control modules 112 to affect various aspects of aircraft operations. For example, but not by way of limitation, the other subsystem control modules 112 may include, but are not limited to, a landing gear actuation module, a cabin environment control system, a throttle control system, a propulsion system, a radar system, and a data entry system.

Speech I/O interface 116 is suitably configured to couple headset 160 with the system 100, which enables system 100 to communicate with a system user (e.g., a pilot) through speech. For example, when the system user produces an utterance that is captured as an analog signal by a microphone 162, speech I/O interface 116 digitizes the analog speech signal and provides the digital command audio data 222 (see FIG. 2) to speech recognition system 140 for analysis by a speech recognition algorithm. In addition, processing system 102 and other system components (e.g., communication module 120) may provide digital speech signals to speech I/O interface 116, which may generate analog speech signals from the digital speech signals and provide the analog speech signal to one or more speakers 164 of the headset 160. Speech I/O interface 116 allows pilot voice commands to be pre-processed and digitized for use by speech recognition system 140 (and particularly command and control speech engine module 210) to output machine command data for control functions of various avionics systems such as displays system 106, FMS 134, communication module 120, etc.

Flight management system 132 (FMS) (or, alternatively, a flight management computer) is located onboard an aircraft and is included in aircraft system 100. Flight management system 108 is coupled to displays system 106, navigation database 452 (see FIG. 4) and one or more additional modules or components as necessary to support navigation, flight planning, and other aircraft control functions in a conventional manner. In addition, the flight management system 108 may include or otherwise access a terrain database, navigational database 452 (that includes airport diagrams, STAR, SID, and en route procedures, for example), geopolitical database, taxi database, or other information for rendering a navigational map or other content on displays system 100, as described below. FMS 132 is capable of being controlled by commands from command and control speech engine module 210 (see FIG. 2) based on voice commands from aircrew. FMS 132 is capable of tracking a flight plan 450 (see FIG. 4) and also allowing a pilot and/or autopilot system (not shown) to make changes to the flight plan. The flight plan 450, updates to the flight plan, pilot and/or autopilot interactions with FMS 132, tracking of flight plan 450 are sources of flight context data 228 (see FIG. 2) for use by the speech recognition system 140 in determining any words to be added or removed from command and control speech engine module 210.

In an exemplary embodiment, the navigation system 104 is configured to obtain one or more navigational parameters associated with operation of an aircraft. The navigation system 104 may include a global positioning system (GPS), inertial reference system (IRS) and/or a radio-based navigation system (e.g., VHF omni-directional radio range (VOR) or long range aid to navigation (LORAN)), and may include one or more navigational radios or other sensors suitably configured to support operation of the navigation system, as will be appreciated in the art. In an exemplary embodiment, the navigation system 104 is capable of obtaining and/or determining the current location of the aircraft (e.g., with reference to a standardized geographical coordinate system) and the heading of the aircraft (i.e., the direction the aircraft is traveling in relative to some reference) and providing these navigational parameters to the flight management system 108, for example. Current location data from navigation system provides flight context data 228 (see FIG. 2) useful in deriving relevancy of additional words to be added or removed from recognized lexicon of command and control speech engine module 210.

Figure 2:
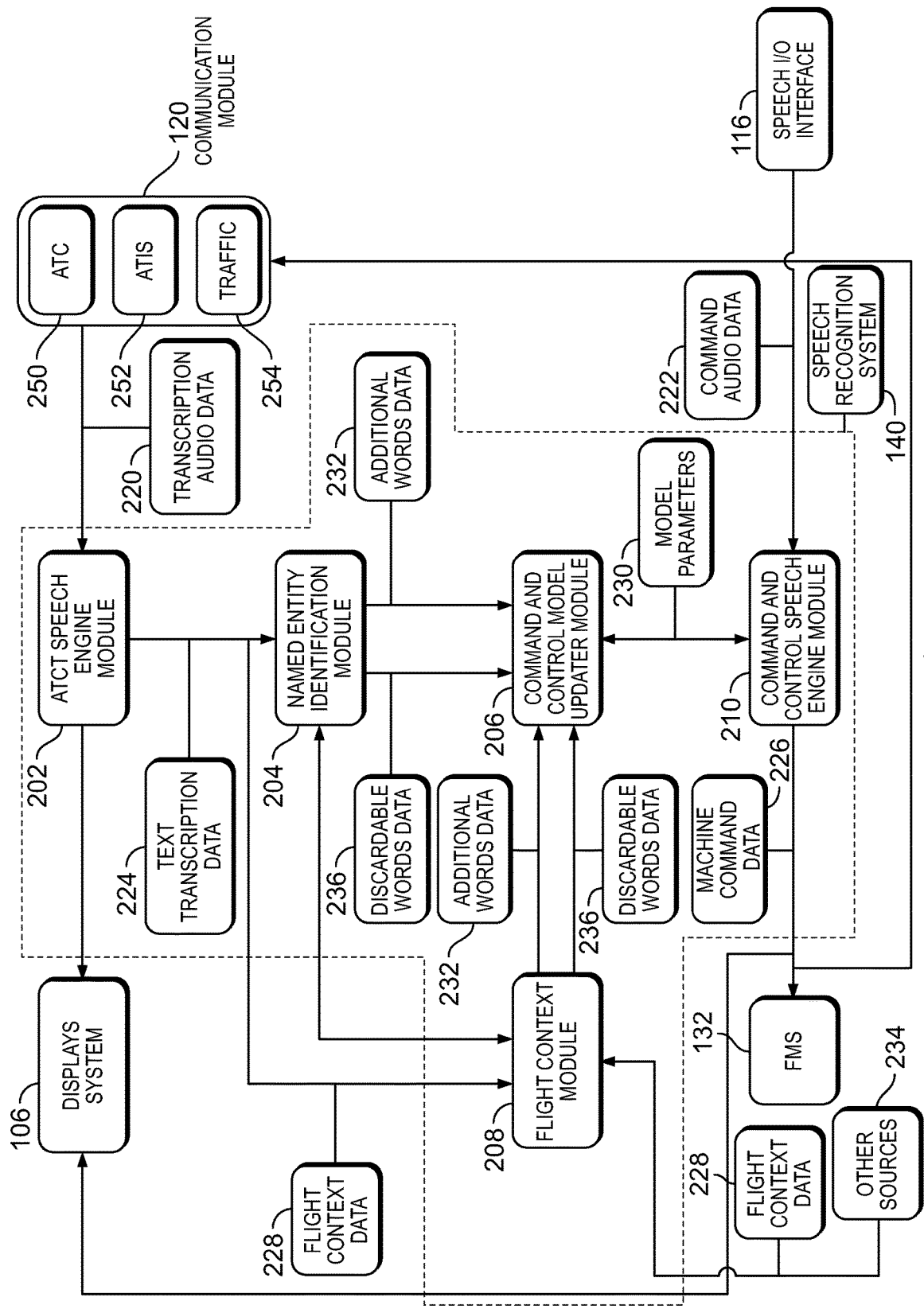
FIG. 2 is a schematic block diagram of a speech recognition system, in accordance with various embodiments.

In accordance with various embodiments, and with reference to FIGS. 1 and 2, speech recognition system 140 is configured to receive flight context data 228 from various sources (to be detailed further herein). Named entities included in flight context data are candidates for adding to models (see second language and acoustic models 402', 404' in FIG. 3) of command and control speech engine module 210 to extend its capabilities. Named entities correspond to named locations, named vehicles and named processes such as waypoints, airports, runways, other aircraft, approach procedures. In embodiments, named entities are avionics standard named entities such as International Civil Aviation Organization codes. When a determination is made to add the named entities that have been extracted from flight context data (e.g. based on whether candidate named entities is not included in a maintained list of words trained for command and control speech engine module 210, whether based on other flight context data there is a likelihood of requiring those named entities, etc.), speech recognition system 140 copies model parameters from models (e.g. first language and acoustic models 402, 404 in FIG. 2) of ATCT speech engine module 202 and added to command and control speech engine module 210. Further, flight context data 228 is also indicative of when any previously added words can be removed from command and control speech engine module 210 (e.g. due to updated flight plan, due to aircraft having passed named parts of flight plan and/or due to named entity not being included in flight context data 228 for a certain minimum period of time). In embodiments, speech recognition system 140 thus updates command and control speech engine module 210 by adding and removing model parameters corresponding to named entities based on flight context data 228. In this way, speech recognition system 140 extends use capabilities of command and control speech engine module 210 by usefully utilizing model parameters transferred from ATCT speech engine module 202 and also keeps response times fast by removing no longer required model parameters.

FIG. 2 is a functional block diagram of a speech recognition system 140, in accordance with an exemplary embodiment. The illustrated embodiment of the speech recognition system 140 includes, without limitation: an ATCT speech engine module 202; a named entity identification module 204; a command and control update module 206; a flight context module 208; and a command and control speech engine module 210. A processing system (e.g., processing system 102, FIG. 1) of the aircraft system 100 may implement the various modules of speech recognition system 140. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Generally, modules of speech recognition system are stored in data storage 104 and executed by processing system 102.

Speech recognition system 140 of aircraft system includes two different speech engine modules, namely ATCT speech engine module 202 and command and control speech engine module 210. ATCT speech engine module 202 has a far more extensive trained vocabulary of recognized words including a full set of named entities, whereas command and control speech engine module 210 has a relative limited trained vocabulary but has significantly faster response times. It is important to maintain relatively fast response times of command and control speech engine module 210 but it would also be useful to extend capabilities of command and control speech engine module 210, particularly so as to enable decoding of relevant named entities and command. Although the speech engine modules differ in terms of trained vocabulary, they are the same or similar in terms of architecture and speech recognition processes. These architecture and processes will be described with reference to FIGS. 5 and 6, in accordance with one embodiment.

Figure 5:
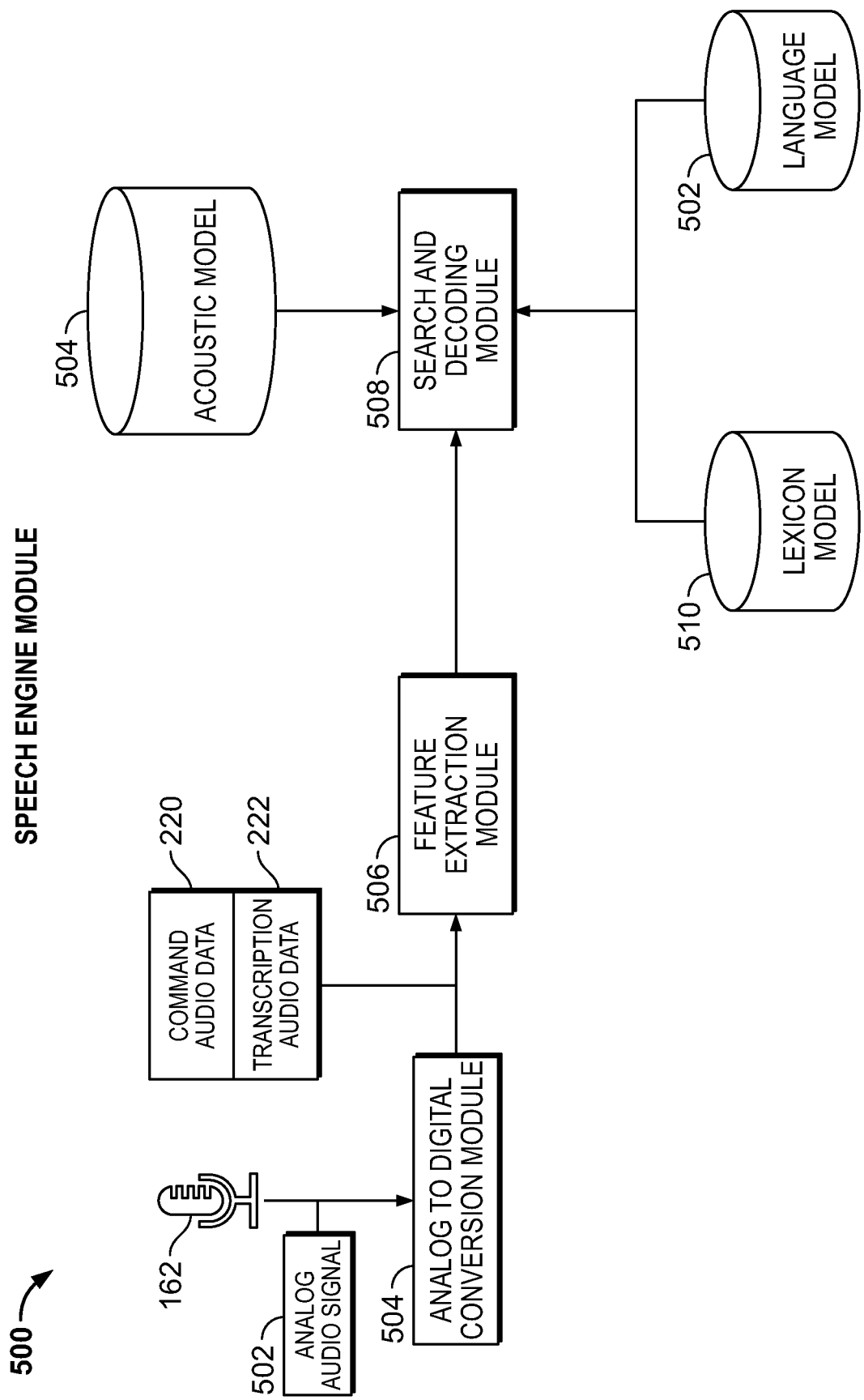
FIG. 5 is a block diagram of a speech engine module, in accordance with various embodiments.

FIG. 5 provides a schematic block diagram overview of a speech engine module 500 (which could be ATCT speech engine module 202 or command and control speech engine module 210). An analog audio signal 502 is received from microphone 162 or is received at communication module 120 or from some other source of speech data. Analog to digital conversion module 504 is configured to convert the analog audio signal into digital transcription audio data 220 or digital command audio data 222. Feature extraction module 506 is configured to extract salient feature vectors from the digital audio data 220, 222 for further processing. Search and decoding module 508 is configured to use lexicon model 510, language model 502 and acoustic model 504 to generate a word sequence that has the maximum posterior probability for the input feature vector provided by feature extraction module 506. Although lexicon model is shown separately for the purposes of the present description, lexicon model 510 is considered to be merged into language model 502 in much of the present disclosure.

Acoustic model 504 includes a representation of knowledge about acoustics, phonetics, microphone and environment variability, gender and dialect differences among speakers, etc. Language model 502 refers to knowledge of what constitutes a possible word, what words are likely to co-occur, and in what sequence. Lexicon model 510 specifies elementary units to build each word in language model. The elementary units of choice are usually phonemes or phone-like units.

If 'A' represents the acoustic features of the speech audio data 220, 222 and 'W' represents a word sequence, then search and decoding module 508 is configured to determine the probability of the word sequence for the given acoustic feature:

$$P(W|A) = \frac{P(A|W)P(W)}{P(A)}$$

where "P(A|W)" represents the training of the acoustic model and "P(W)" represents the language model. For a classification-based system, we ignore P(A). Processing time of speech engine module 500 depends largely on size of models, which depends largely on a number of words (the recognized lexicon) of the acoustic and language models 502, 504, 510.

In one embodiment, acoustic model 504 is constructed using a Neural Network (NNET) or Gaussian Mixture Model (GMM). In one embodiment, lexicon model 510 and language model 502 are constructed using Weighted Finite State Transducers. In embodiments, the models 502, 504, 510 are trained based on audio files and manually transcribed texts.

Figure 6:
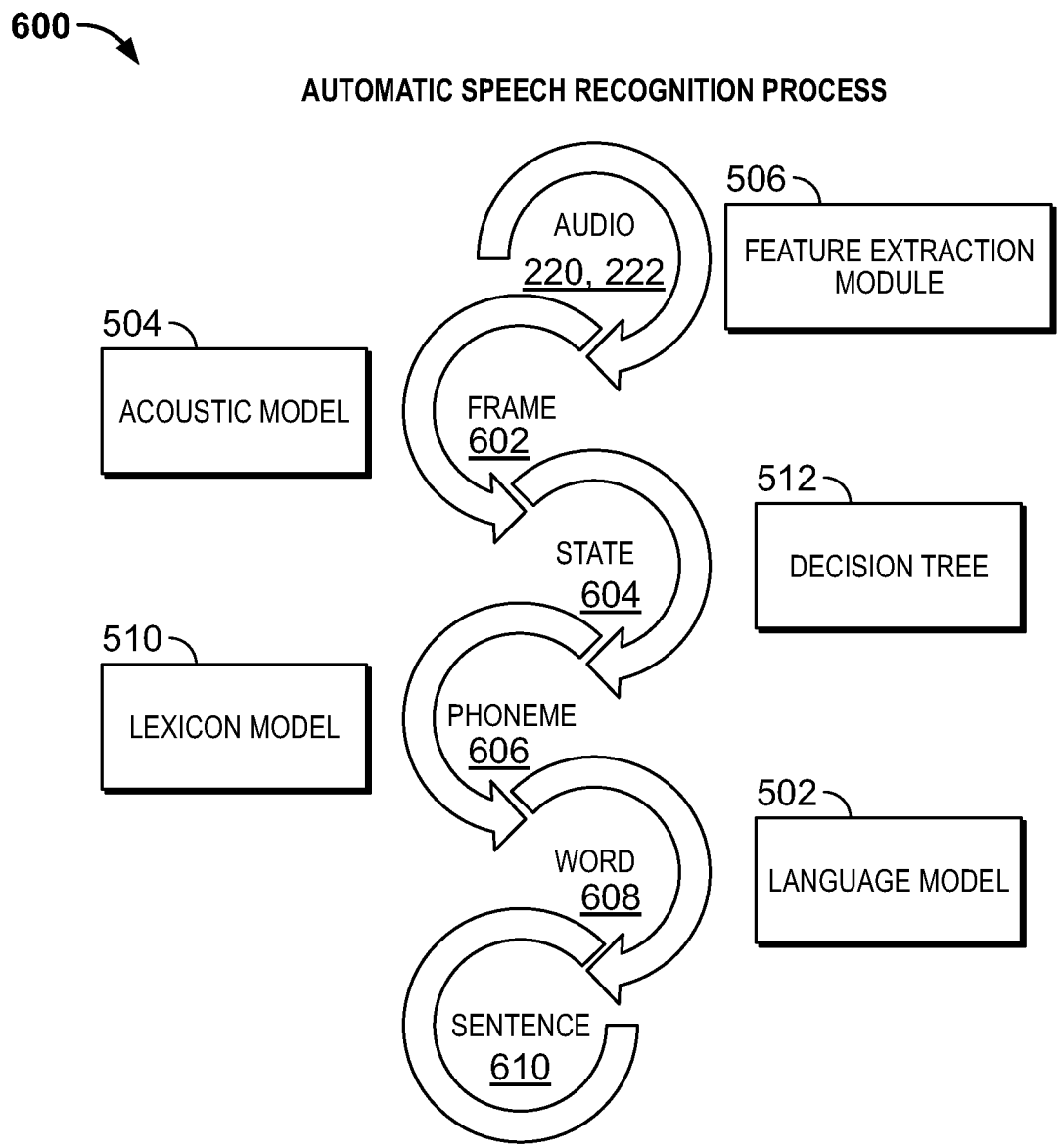
FIG. 6 is flowchart of a method of speech recognition in a speech engine module, in accordance with various embodiments.

Referring to FIG. 6, an exemplary make-up of acoustic and language models 502, 504, 510 in speech engine module 500 and associated automatic speech recognition process 600 is provided, in accordance with various embodiments. Automatic speech recognition process 600 includes speech feature extraction on audio data 220, 222 to provide frames 602 of speech feature vectors. Acoustic model 504 operates on frames 602 of speech feature vectors to produce state data 604. Data processing of state data 604 to lexicon and language models 502, 510 is routed through decision tree 512, which uses a temporal pattern detector (HMM for e.g.). Lexicon and language models 502, 510 are configured to identify phonemes 606, build words 608 from phonemes and to output a sentence 610 or word sequence. Search and decoding module 508 is configured to search the architecture of models shown in FIG. 6 to produce a maximum posterior probability corresponding to a determined word sequence. Speech engine module 500 is configured to output the word sequence in the form of text data, thereby converting input speech data into output text data. Output from the speech engine module 500 is a word sequence made up of words that are part of the recognized lexicon of the speech engine module 500. The recognized lexicon corresponds to possible output nodes of the speech engine module of words which have been trained. ATCT speech engine module 202 has a far greater number of possible trained output words (a more extensive recognized lexicon) than command and control speech engine module 210.

Referring back to FIG. 2, speech recognition system 140 ATCT speech engine module 202 is configured to receive audio data for transcription, referred to herein as transcription audio data 220. ATCT speech engine module is configured to transcribe transcription audio data 220 into text transcription data 224 using first acoustic and language models 402, 404 (see FIGS. 3 and 4) and a speech recognition algorithm/process as exemplified in FIG. 6. Transcription audio data can be received from one more sources. In the exemplary embodiment, communication module 120 outputs transcription audio data 220 embodying voice or speech data that has been radioed or otherwise broadcast to aircraft system 100 from other aircraft, from air traffic control (ATC) and from other ground broadcasting systems. In the example of FIG. 2, transcription audio data 220 is received, via communication module 120, from ATC 250, from automatic terminal information service (ATIS) 252 and from other air traffic 254. As described further herein, text transcription data 224 can include named entities and thus provide one example source of flight context data 228.

Speech recognition system 140 includes command and control speech engine module 210. Command and control speech engine module 210 is configured to receive command audio data 222 from speech I/O interface 116, to decode the command audio data 222 using second acoustic and language models 402', 404' and to determine command text data (not shown), which can be used to generate machine command data 226 for controlling a function or functions of one or more avionics systems. Command audio data 222 thus includes a voice command from a pilot directed to one or more avionics systems and including a designated command. In embodiments described herein, command audio data 222 further includes a named entity that can also be recognized by command and control speech engine module 140 because of model parameters 230 that have been borrowed from ATCT speech engine module 202 and added to second language and acoustic models 402', 404'.

Speech recognition system 140 includes command and control model updater module 206. Command and control model updater module 206 is configured to receive additional words data 232, which indicates one or more additional words that are deemed likely or possibly to be required by command and control speech engine module 210. In particular, additional words data 232 includes information on one or more named entities that have been determined as appropriate to add to the recognized lexicon (lexicon of recognized output words) of command and control speech engine module 210. Named entities include, without limitation, way points, approach procedures, call signs for other aircraft and/or flight names, etc. In embodiments, named entities include International Civil Aviation Organization, ICAO, codes.

Additional words data 232 has been determined based on flight context data 228 (described further below) by flight context module 208 as described in further detail below. In some embodiments, command and control model updater module 206 is configured to determine whether one or more additional words in additional words data 232 is not included in the recognized lexicon of command and control speech engine module 210. Alternatively, this step could be performed by flight context module 208 so that additional words are passed to command and control update module 206 only when they are not part of the trained words of command and control speech engine module 206. To make such a determination, speech recognition system 140 could keep a dynamic list of words recognized by command and control speech engine module 210 that is updated each time that a word is added or removed by command and control model updater module 206.

In accordance with various embodiments, when additional words data 228 includes one or more words that are not recognized by command and control speech engine module 210 and when command and control model updater module determines (based on flight context data 228) that such additional words should be added, command and control model updater module 206 is configured to copy acoustic and language model parameters from ATCT speech engine module 202 and to add these model parameters to command and control speech engine module 210. In this way, one or more additional words have been added to the recognized lexicon of command and control speech engine module 210 so that these additional words can be uttered by the pilot, decoded by command and control speech engine module 210 and included in machine command data 226 for controlling a function of a sub-system of aircraft system 100.

In accordance with various embodiments, command and control model updater module 206 is configured to remove one or more additional words from the recognized lexicon of command and control speech engine module 210. In one embodiment, command and control speech engine module 210 is configured to receive discardable words data 236 representing one or more words that have previously been added to the recognized lexicon of command and control speech engine module 210 but have been determined to no longer be required. Flight context module 208 is configured to determine discardable words data 236 based on flight context data 228 as described further below. Command and control model update module 210 is configured to remove model parameters corresponding to the discardable words (e.g. named entities as defined above) in discardable words data 236. By dynamically updating (removing words from and adding words to) the recognized lexicon of command and control speech engine module 210, the command and control speech engine module 210 is kept at an optimum size for relevancy and processing time based on flight context data 228.

It is possible to backtrack through the various components (e.g. language model 402, lexicon model 510, acoustic model 404) of ATCT speech engine module 202 to isolate the set of model parameters that correspond to each recognized word. Such words (or the constituent parts—phonemes—thereof) and associated model parameters can be labelled so that command and control model update module 206 is able to copy model parameters from ATCT speech engine module 202 for adding or concatenating to command and control speech engine module 210. Similarly, these added model parameters corresponding to a particular word can be removed from command and control speech engine module 210 based on word or phoneme labels.

Speech recognition system 140 includes flight context module 208, in various embodiments. Flight context module 208 is configured to receive flight context data 228 from various sources and to determine additional word(s) that should be added to command and control speech engine module 210 or to determine discardable word(s) that should be removed from command and control speech engine module 210 so as to adapt to the flight context data 228.

Flight context data 228 is obtainable from various sources. In one embodiment, flight context data 228 is derived from text transcription data 234 from ATCT speech engine module 202. That is, transcriptions of transcription audio data 220 from communication module 120 provide useful flight context data 228. Transcriptions of air and ground traffic communications, air traffic control communications, ATIS communications, pilot communications, etc. all provide information on flight context. Furthermore, other sources 234 of flight context data 228 are available to the flight context module 208. In embodiments, data from traffic collision avoidance system (TCAS), data from flight management system (e.g. flight plan data) 132, data from navigation database interrogated by flight management system 132, data from navigation system 134, data from displays system 106, data from user interface 108 and/or other avionics systems all provide information relating to flight context and thus allow flight context data 228 to be determined.

In embodiments, flight context module 208 operates together with named entity identification module 204 to find named entities in text transcription data 224 through a natural language processing algorithm. In other embodiments, flight context module 208 is configured to determine named entities in flight context data 228 from other sources 234, optionally by using natural language processing capabilities of named entity identification module 204. In this way, flight context data 228 is used by flight context module 208 to determine any additional words or named entities that seem likely to be required (because of their presence in the flight context data 228) and any previously added words that seem likely no longer to be required (because they have not been included in flight context data 228 for a certain amount of time or because they are no longer relevant based on progress of the aircraft along the flight plan, etc.).

In examples, a flight plan 450 (see FIG. 4) will provide flight context data 228 including waypoints, airports, runways, approach and departure procedures that are suitable for adding corresponding named entities to command and control speech engine module 210. Updates to a flight plan 450 will similarly provide new named entities and may replace old named entities. Named entities included in communications from other aircraft, from air traffic control and from ATIS as resolved by named entity identification module 204 are suitable for adding to command and control speech engine module 210. In some embodiments, command and control model updater module 206 does not add all named entities included in current flight context data 228, but instead performs a relevancy check based on flight context data before determining which words are to be added to command and control speech engine module 210. For example, if a named entity received from a data source relates to a waypoint that has already been passed, then that named entity would not be added. A part of flight plan that has already been traversed will include named entities that are no longer relevant to the command and control speech engine module 210. Explorations by a pilot through user interface 108 and flight management system 132 can include named entities. Thus, flight context module 208 is able to determine additional words data 232 and discardable words data 236 based on flight context data 228 for the purpose of command and control model update module 206 keeping the size (in terms of number of words and associated model parameters) of command and control speech engine module 210 appropriate to foreseen flight context.

Command and control speech engine module 210 is configured to receive command audio data 222 through speech I/O interface 116 and to convert the command audio data 220 into text command data (not shown) using a speech recognition algorithm as described heretofore. The speech recognition algorithm includes, or references, second language model 402' and second acoustic model 404' that have model parameters dynamically updated based on named entities deemed relevant to flight context data 228. The text command data is processed by command and control speech engine module 210 to generate commands to various avionics systems in the form of machine command data 226. In examples, machine command data 226 is output to flight management system 132, displays system 106 and/or communication module (120) (e.g. radio) to control one or more functions offered by these avionics systems.

Figure 3:
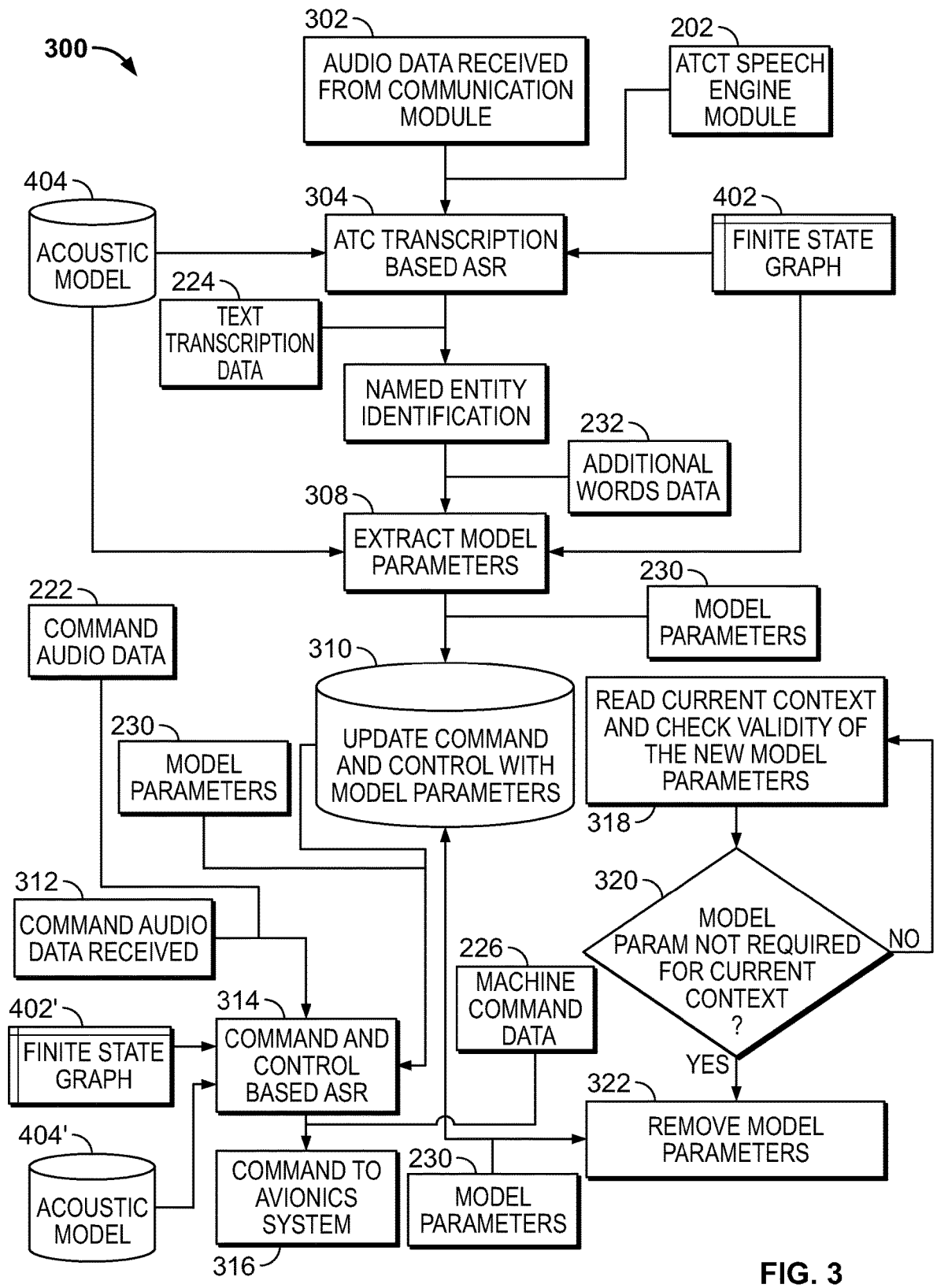
FIG. 3 is a flowchart of a method of speech recognition in an aircraft system, in accordance with various embodiments.

FIG. 3 is a flowchart of a method 300 for implementing a speech recognition system 140 of an aircraft system 100, in accordance with an exemplary embodiment. The method 300 can be implemented in connection with the aircraft system 100 of FIG. 1, particularly the processing system 102 thereof, and/or the speech recognition system 140 of FIGS. 1 and 2, in accordance with an exemplary embodiment. The flowchart of method 300 relates to a so-called tactical mode whereby flight context data 228 is obtained from ATCT speech engine module 202.

In step 302, transcription audio data 220 is received from communication module 120. Transcription audio data 220 can include directions broadcast to another aircraft, directions broadcast to ownship aircraft or general information provided by ATC, ATIS, air or ground traffic and other broadcasted sources of audio information that are received through communication module 202.

In step 304, transcription audio data 220 is transcribed by ATCT speech engine module 202 using an automatic speech recognition algorithm that includes or references first acoustic model 404 and first language model 402. First language model 402 includes merged language and lexicon models 502, 510 (shown as a merged finite state graph in FIG. 3). In this way, text transcription data 224 is provided.

In step 306, one or more named entities are identified from text transcription data 224. Flight context module 208 and named entity identification module 204 operate together to process text transcription data 224, which is operating in this embodiment as flight context data 228, to resolve named entities included in the text transcription data 224. In some embodiments, a list of current words included in command and control speech engine module 210 is maintained by command and control model update module 206 to allow determination of whether named entities included in text transcription data 224 are additional to words already included in the list. Further, a determination may be made as to whether each of the named entities are relevant to the current flight context before included them in additional words data 232. Based on determination that one or more resolved named entities are relevant to current flight context (optional) and not already included in recognized lexicon of command and control speech engine module 210, the one or more named entities are passed to step 308 in the form of additional words data 232.

In step 308, model parameters 230 are extracted from first acoustic and language models 402, 404 of ATCT speech engine module 202 that correspond to words (based on additional words data 232) that are to be added to command and control speech engine module 210, specifically the second acoustic and language models 402', 404' thereof. Step 308 includes command and control model updater module 206 copying the model parameters based on labels associating model parameters sets and words or phenomes.

In step 310, model parameters 230 that are specific to the additional word(s), which have been extracted from ATCT speech engine module 202, are added to the command and control speech engine module 210 by building them into the acoustic and language models 402', 404' for the command and control speech engine module 210.

In step 312, command audio data 222 is received through microphone 162 from speech of a crew member. In one embodiment, the command audio data 222 includes a reference to one of the added named entities. In step 314, command and control speech recognition engine module 210 is able to determine command text from the command audio data 222 including the added named entity, which is converted to machine command data 226. Command and control speech recognition engine module 210 utilizes second language and acoustic models 402', 404' that have been augmented with additional model parameters 230 based on additional named entities. In step 316, commands are output to one or more avionics systems (e.g. FMS 132, communication module 120 and/or displays system 106) based on the machine command data 226.

Method 300 further includes a portion for discarding model parameters of words from second acoustic and language models 402', 404' that are determined to no longer be required. In step 318, current flight context data 228 is read and validity of previously added words is checked against the current flight context. When command and control speech engine module 206 determines, in step 320, that any added words are no longer required (e.g. because no longer in flight plan 450 or not having been included in flight context data 228 for a certain amount of time or no longer relevant to aircraft's progress along the flight plan 450), then the model parameters 230 specific to that word or words is removed from command and control speech engine module 206.

Figure 4:
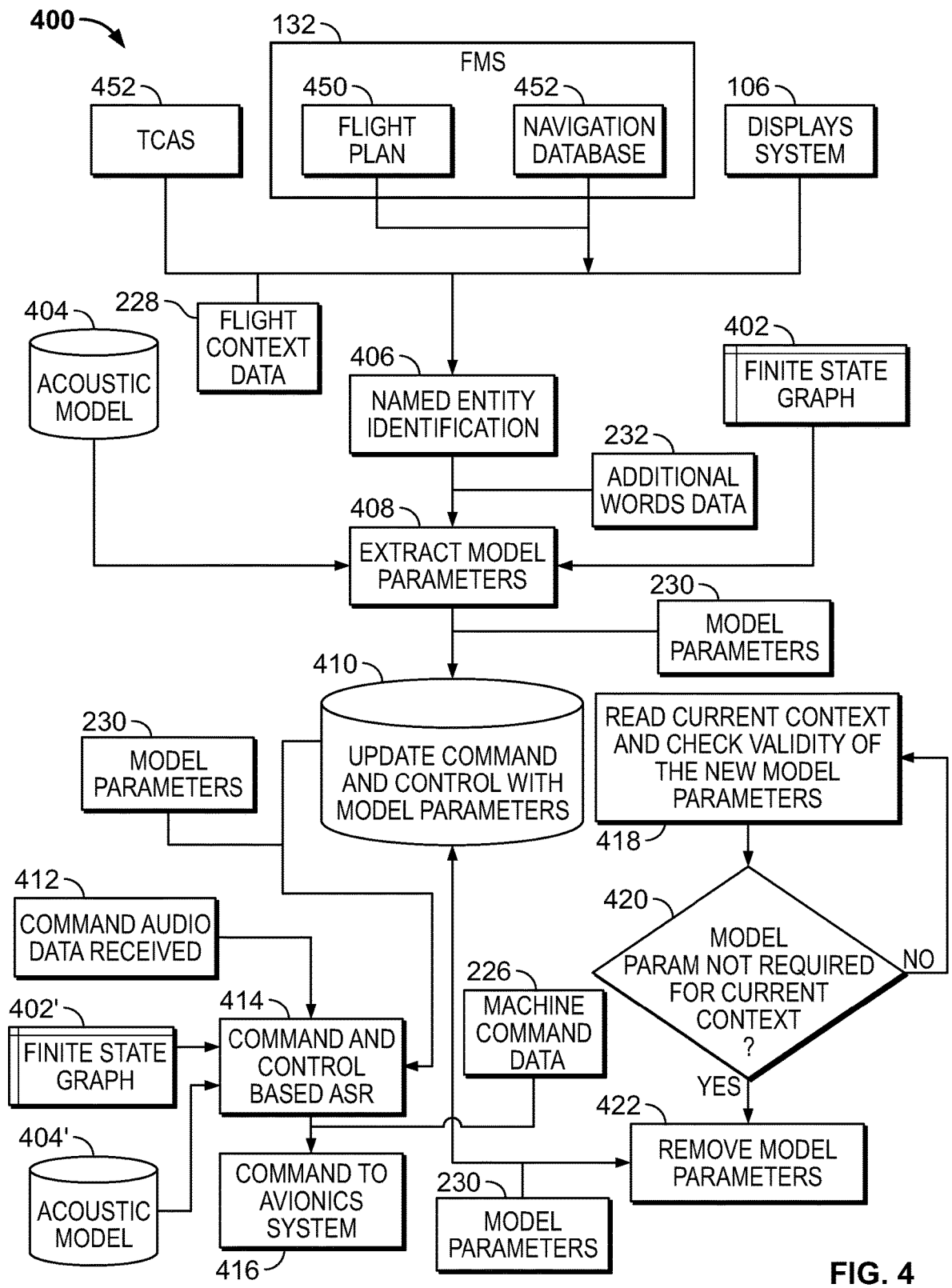
FIG. 4 is a flowchart of a method of speech recognition in an aircraft system, in accordance with various embodiments.

FIG. 4 is a flowchart of a method 400 for implementing a speech recognition system 140 of an aircraft system 100, in accordance with an exemplary embodiment. The method 400 can be implemented in connection with the aircraft system 100 of FIG. 1, particularly the processing system 102 thereof, and/or the speech recognition system 140 of FIGS.

1 and 2, in accordance with an exemplary embodiment. The flowchart of method 400 relates to a so-called strategic mode whereby flight context data 228 is obtained from other sources 234 than text transcription data 224. In one embodiment, the strategic mode of FIG. 4 differs from the tactical mode in FIG. 3 in that the command and control speech engine module 210 is updated with additional words in advance (e.g. before take-off) of use whereas the tactical mode is carried out real time as needed.

In step 406, named entities are identified from a variety of sources of flight context data. In the shown example, a flight plan 450 is constructed by flight management system 132 using navigation data from navigation database 452 to provide flight context data 228. In the example, displays system 106 additionally or alternatively provides flight context data 228. Further, traffic collision avoidance system 452 can additionally or alternatively provide flight context data 228. These other sources 234 of flight context data 228 are provided by way of example and not limitation. Named entity identification module 204 and/or flight context module 208 identify and extract named entities from the flight context data 228 in step 406 to provide additional words data 232.

Remaining steps of method 400 correspond to those described with reference to FIG. 3 for method 300. These steps will not, therefore, be described in detail to avoid repetition. In accordance with various embodiments, named entities to be added are determined from additional words data 232 and corresponding model parameters 230 are extracted from ATCT speech engine module 202 in step 408. Command and control speech engine module 210 is augmented with the extracted model parameters 230 in step 410 for use in speech to text processing in step 414 for providing commands to avionics systems in step 416. Further, current flight context data 228 is continuously monitored in step 418 to determine in step 420 which, if any, of the added words, and the corresponding model parameters 230, can be removed in step 422.

Methods and systems described herein, provide for command and control speech engine module 210 (e.g. application) and ATCT speech engine module 202 (e.g. application) running in conjunction in the aircraft system 100 (e.g. aircraft cockpit system) with different models. The models are different in that ATCT speech engine module 202 has been trained to recognize far more words (using different training sets) than command and control speech engine module 210. In order to make the command and control speech engine module 210 work for named entities and to extend its use cases, dynamic updates to model parameters 230 of the command and control speech engine module 210 are disclosed. The dynamic updates are carried out by copying those model parameters 230 from the ATCT speech engine module 202.

In one embodiment, ATCT speech engine module 202 receives incoming voice data included in transcription audio data 220 (such as from ATC/ATIS/OTHER TRAFFFIC) and provides a transcription thereof. Natural language processing is performed on the transcribed text (embodied in text transcription data 224) to identify one or more named entities such as Waypoint/NAVAID idents, Calls Signs, Flight Names etc., which provides flight context data 228. Based on the flight context data 228, acoustic and language model parameters 230 corresponding to one or more named entities are copied from the ATCT speech engine module 202 to the command and control speech engine module 210. The command and control speech engine module 210 receives these model parameters and updates the second acoustic and language model 402', 404' dynamically to allow the added named entities to be decoded and used in production of commands for one or more avionics systems. When the flight context changes (e.g. change in flight plan, change in current location of aircraft, etc.), the updated model parameters 230 are removed from the command and control speech engine module 210 so as to maintain a compact size (and thus processing time) of the second acoustic and language models 402', 404'.

Thus, model parameters 230 are added to the command and control speech engine module 210 in a way that is limited to the current flight context (which is embodied by flight context data 228). The command and control speech engine module 210 is not required to remember the additional model parameters throughout the flight. When the flight context changes (e.g. change in flight plan or change in aircraft location), model parameters are forgotten as they will not be used. In embodiments, new words are pushed by air traffic control 250 based on the current flight context. Updating of the model parameters 230 can be conditioned on multiple triggers, such as change in position of aircraft, request from command and control model updater module 206 and is not limited only to named entity identification based on text transcription data 224.

In an additional or alternative embodiment, flight context data 228 is obtained for the current flight based on Flight Plan 450, Navigation Database 452 information, TCAS 452, Displays system 106, etc. Named entities are filtered out from the flight context data 228 via named entity identification module 204. With the named entities, acoustic and language model parameters 230 corresponding to the named entities are copied from the ATCT speech engine module 202 to the command and control speech engine module 210. The command and control speech engine module 210 receives the model parameters 230 and updates the second acoustic and language models 402', 404' dynamically to allow these named entities to be decoded. When the flight context changes, the updated model parameters 230 are removed from the command and control speech engine module 210 depending on flight context relevancy.

Methods and systems disclosed hereinabove will be further described with reference to first to third example scenarios.

In a first example scenario, the following aircraft are flying: MOONEY 5810, SAS 941, CACTUS 17. State of Aircraft: MOONEY 5810—Cruise, Planning to descent after SAS 941; SAS 941—ATC in conversation to request report of crossing waypoint AFRIC; CACTUS 17—In Approach, ATC given instruction to HOLD at waypoint GILA. MOONEY 5810 is equipped with a speech recognition system 140 as described herein. ATCT speech engine module 202 in MOONEY 5810 decodes ATC voice data given to SAS 941—"REPORT CROSSING AFRIC" and voice data given to "CACTUS 17—HOLD WAYPOINT GILA". MOONEY 5810 initiated descent. Model parameters for AFRIC & GILA are copied to command and control speech engine module 210. ATC asks MOONEY 5810 to perform DIRTO to AFRIC. Pilot of MOONEY 5810 issues a voice command DIR-TO AFRIC, which command and control speech engine module 210 is able to decode and translate into machine command data 226. A temporary flight plan is created including the DIR-TO AFRIC course.

In a second example scenario, indirect references are used for determining model parameters to transmit to command and control speech engine module 202. The following aircraft are flying: MOONEY 5810, SAS 941, CACTUS 17. State of Aircraft: MOONEY 5810—Cruise, Planning to descent after SAS 941; SAS 941—TUNE Deer Valley Tower 122.1; CACTUS 17—In Approach, ATC given instruction to HOLD at waypoint GILA. MOONEY 5810 is equipped with speech recognition system 140 as described herein. ATCT speech engine module 202 in MOONEY 5810 decodes the following text transcription data 224: SAS 941—TUNE KDVT 122.1 and CACTUS 17—HOLD WAYPOINT GILA. Model parameters for AFRIC, KDVT and GILA are copied to command and control speech engine module 210. ATC asks MOONEY 5810 to perform DIR TO KDVT. Pilot of MOONEY 5810 voice commands DIR-TO KDVT, which is decoded by command and control speech engine module 210. A temporary flight plan is created based on the decoded voice command.

In a third example scenario, ATCT speech engine module 202 receives flight context data 208 such as waypoints from flight plan 450. Under direction of command and control model update module 206, model parameters (e.g. scores) for the named entities corresponding to those way points are extracted from ATCT speech engine module 202 and sent to command and control speech engine module 210. If the flight plan is KPHX-TOE-KDVT, model parameters 230 for each of these named entities are transferred to command and control speech engine module 210. MOONEY 5810 is equipped with speech recognition system 140 as described herein. Pilot voice commands "CENTER KDVT". Command and control speech engine module 210 is able to decode KDVT and issue corresponding machine command data 226 to displays system 106. MAP centers to KDVT through displays system 106.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A speech recognition system for an aircraft, comprising:
   at least one processor configured to:
      execute an air traffic control transcription application using first acoustic and language models, wherein the air traffic control transcription application is configured to recognize a first set of words, receive audio data and to output a transcription of the audio data, the air traffic control transcription application having a first response time;

execute a command and control speech recognition application using second acoustic and language models, wherein the command and control speech recognition application is different from the air traffic control transcription application, has a second response time that is faster than the first response time, and is configured to recognize a second set of words and wherein the second set of words includes fewer words than the first set of words;

receive flight context data, the flight context data including at least one of transcription text data output from the air traffic control transcription application, flight plan data, current aircraft location data, user interface data, and displays system data;

perform natural language processing on the transcription to identify additional words including at least one named entity corresponding to a location, wherein the additional words are not included in the second set of words and are useful based on the flight context data;

extract acoustic and language model parameters corresponding to the additional words including the at least one named entity from the first acoustic and language models;

add the extracted acoustic and language model parameters corresponding to the additional words including the at least one named entity from the first acoustic and language models to the second acoustic and language models to generate an updated second set of words including the additional words;

determine discardable words in the second set of words based on the flight context data;

remove acoustic and language model parameters corresponding to the discardable words from the second acoustic and language model thereby removing the discardable words from the second set of words; and generate an aircraft control command encapsulating at least one of the additional words using the command and control speech recognition application, wherein the at least one of the additional words is recognized by the second acoustic and language models with the extracted acoustic and language model parameters that have been added to the second acoustic and language models.

2. The speech recognition system of claim 1, wherein the command and control speech recognition application is configured to receive voice command audio data from an operator of the aircraft and to output commands for at least one function of the aircraft.

3. The speech recognition system of claim 1, wherein the at least one processor is configured to receive the flight context data and to perform a relevancy check on the additional words, wherein the flight context data includes navigation data including named entities representing locations.

4. The speech recognition system of claim 1, wherein the flight context data is received from a navigation system and a flight management system, wherein the at least one processor is configured to determine discardable words representing named entities from a planned route for the aircraft that are not relevant with respect to a current position of the aircraft, wherein the planned route and the current position are defined in the flight context data received from the navigation system and the flight management system.

5. The speech recognition system of claim 1, wherein the flight context data is derived from at least one of:
traffic collision avoidance system data; and
navigation database data.

6. A speech recognition method in an aircraft, comprising:
executing, via at least one processor, an air traffic control transcription application using first acoustic and language models, wherein the air traffic control transcription application is configured to recognize a first set of words, receive audio data and to output a transcription of the audio data, the air traffic control transcription application having a first response time;

executing, via the at least one processor, a command and control speech recognition application using second acoustic and language models, wherein the command and control speech recognition application is different from the air traffic controller transcription application, has a second response time that is faster than the first response time, and is configured to recognize a second set of words and wherein the second set of words includes fewer words than the first set of words;

receiving, via the at least one processor, flight context data, the flight context data including at least one of transcription text data output from the air traffic control transcription application, flight plan data, current aircraft location data, user interface data, and displays system data;

performing natural language processing, via the at least one processor, on the transcription to identify additional words including at least one named entity corresponding to a location, wherein the additional words are not included in the second set of words and are useful based on the flight context data;

extracting, via the at least one processor, acoustic and language model parameters corresponding to the additional words including the at least one named entity from the first acoustic and language models; and adding, via the at least one processor, the extracted acoustic and language model parameters corresponding to the additional words including the at least one named entity from the first acoustic and language models to the second acoustic and language models to generate an updated second set of words including the additional words;

determining, via the at least one processor, discardable words in the second set of words based on the flight context data;

removing, via the at least one processor, acoustic and language model parameters corresponding to the discardable words from the second acoustic and language model thereby removing the discardable words from the second set of words; and generating, via the at least one processor, an aircraft control command encapsulating at least one of the additional words using the command and control speech recognition application, wherein the at least one of the additional words is recognized by the second acoustic and language models with the extracted acoustic and language model parameters that have been added to the second acoustic and language models.

7. The speech recognition method of claim 6, wherein the command and control speech recognition application receives voice command audio data from an operator of the aircraft and outputs commands for at least one function of the aircraft.

8. The speech recognition method of claim 6, comprising receiving, via the at least one processor, the flight context data and performing a relevancy check on the additional words based on the flight context data, wherein the flight context data includes navigation data including named entities representing locations.

9. The speech recognition method of claim 6, wherein the flight context data is received from a navigation system and a flight management system, wherein the method includes determining, via the at least one processor, discardable words representing named entities from a planned route for the aircraft that are not relevant with respect to a current position of the aircraft, wherein the planned route and the current position are defined in the flight context data received from the navigation system and the flight management system.

10. The speech recognition method of claim 8, wherein the flight context data is derived from at least one of:
   traffic collision avoidance system data; and
   navigation database data.

\* \* \* \* \*